(12) United States Patent
Schassler et al.

(10) Patent No.: US 10,431,014 B2
(45) Date of Patent: Oct. 1, 2019

(54) DATA RECORDING FUNCTION

(71) Applicant: Honeywell International Inc., Morris Plains, NJ (US)

(72) Inventors: Justin Schassler, Glendale, AZ (US); Dean E. Sunderland, Glendale, AZ (US); Paul R. Drake, Peoria, AZ (US); Kevin A. Parkhurst, Phoenix, AZ (US); David B. Goldstein, Washington, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 319 days.

(21) Appl. No.: 15/430,889

(22) Filed: Feb. 13, 2017

(65) Prior Publication Data

US 2018/0053355 A1   Feb. 22, 2018

Related U.S. Application Data

(60) Provisional application No. 62/376,513, filed on Aug. 18, 2016.

(51) Int. Cl.
*G07C 5/00* (2006.01)
*G07C 5/08* (2006.01)
(Continued)

(52) U.S. Cl.
CPC ............. *G07C 5/008* (2013.01); *G01D 9/005* (2013.01); *G06F 16/13* (2019.01); *G06F 16/183* (2019.01);
(Continued)

(58) Field of Classification Search
CPC ....... G07C 5/008; G07C 5/085; G06F 16/183; G06F 16/13; G01D 9/005; G06Q 50/30; H04L 67/1097
(Continued)

(56) References Cited

U.S. PATENT DOCUMENTS 6,047,165 A    4/2000 Wright
6,308,044 B1   10/2001 Wright et al.
(Continued)

FOREIGN PATENT DOCUMENTS

WO    2011017812    2/2011

OTHER PUBLICATIONS

European Patent Office, "Extended European Search Report from EP Application No. 17183893.1, dated Oct. 9, 2017", from Foreign Counterpart of U.S. Appl. No. 15/430,889, filed Oct. 9, 2017, pp. 1-7, Published in: EP.

(Continued)

*Primary Examiner* — Tuan C To
(74) *Attorney, Agent, or Firm* — Bookoff McAndrews, PLLC

(57) ABSTRACT

A system and method for dynamically recording vehicle data are provided. The system comprises an electronic unit onboard a vehicle, a data recording function hosted in the electronic unit, and one or more electronic data producers in operative communication with the data recording function. The data recording function is operative to receive a request specifying data parameters that at least include an identified electronic data set to record, a duration for the data recording, and a destination for the data recording. The data recording function is also operative to process the request based on the data parameters to produce a set of real time recorded data from the one or more electronic data producers, and to send the set of recorded data to a data storage location based on the destination in the request.

17 Claims, 4 Drawing Sheets

(51) Int. Cl.
*G06F 17/30* (2006.01)
*H04L 29/08* (2006.01)
*G06F 16/13* (2019.01)
*G06F 16/182* (2019.01)
*G01D 9/00* (2006.01)
*G06Q 50/30* (2012.01)

(52) U.S. Cl.
CPC ............. *G06Q 50/30* (2013.01); *G07C 5/085* (2013.01); *H04L 67/1097* (2013.01)

(58) Field of Classification Search
USPC ........................................................ 701/32.7
See application file for complete search history.

(56) References Cited

U.S. PATENT DOCUMENTS

| | | | |
|---|---|---|---|
| 7,072,746 | B1 | 7/2006 | Burch |
| 7,945,360 | B2* | 5/2011 | Nahapetian ............ G07C 5/085 370/412 |
| 9,141,830 | B2 | 9/2015 | Uczekaj et al. |
| 9,900,560 | B1* | 2/2018 | Kirmani .................. H04N 7/18 |
| 2011/0249658 | A1* | 10/2011 | Wohlert .................. H04W 4/04 370/338 |
| 2012/0265372 | A1* | 10/2012 | Hedrick .................. H04L 67/36 701/3 |
| 2013/0197725 | A1* | 8/2013 | O'Dell .................. H04L 67/125 701/14 |
| 2013/0311038 | A1* | 11/2013 | Kim .................... G01C 21/3641 701/36 |
| 2014/0183269 | A1* | 7/2014 | Glaser .................... G06F 21/32 235/492 |
| 2015/0263886 | A1* | 9/2015 | Wang ...................... H04L 41/08 370/254 |
| 2015/0304813 | A1* | 10/2015 | Esposito ................ H04B 7/155 455/456.2 |
| 2015/0369626 | A1 | 12/2015 | Dabrowski |
| 2016/0035227 | A1* | 2/2016 | Kumar .................... G01C 23/00 340/971 |
| 2016/0176538 | A1 | 6/2016 | Bekanich |
| 2016/0196698 | A1 | 7/2016 | O'Dell et al. |
| 2016/0316363 | A1* | 10/2016 | Li .......................... H04W 12/04 |
| 2017/0013047 | A1* | 1/2017 | Hubbard ................. H04L 67/20 |
| 2017/0083939 | A1* | 3/2017 | Bhagwan ........... G06Q 30/0255 |
| 2017/0106997 | A1* | 4/2017 | Bekanich ............. G08B 25/006 |
| 2017/0161817 | A1* | 6/2017 | Othmer ............... G06Q 30/0631 |
| 2017/0264956 | A1* | 9/2017 | Gerhards ........... H04N 21/4583 |
| 2018/0268359 | A1* | 9/2018 | Soubhagya ............ G06Q 10/08 |

OTHER PUBLICATIONS

Bellamy III, "How New Data Acquisition Tech is Tackling the Information Mountain", "Avionics Digital Edition", Oct.-Nov. 2016, pp. 1-12, Publisher: Avionics Magazine.

"ITU-T Focus Group on Aviation Applications of Cloud Computing for Flight Data Monitoring", Apr. 2016, pp. 1-33, Publisher: International Telecommunication Union.

* cited by examiner

DATA RECORDING FUNCTION

CROSS REFERENCE TO RELATED APPLICATION

This application claims the benefit of priority to U.S. Provisional Application No. 62/376,513, filed on Aug. 18, 2016, which is herein incorporated by reference.

BACKGROUND

The current standard of in-flight data recording is limited to a manual process with pen and paper, as in international flight logs, or with pre-configured reports operating on specific triggers and storing data identified for collection in a set location. These methods are not convenient, robust, or conducive to real-time configuration.

In many existing avionics systems, recording of data is a predefined and automatic function that cannot be modified by an operator before, during, or after flight. In addition, current data recording methods are tied to an aircraft configuration and cannot be changed in real-time.

As such, a method to enable real-time configuration of data recording from both certified and non-certified devices, at any point in time, is needed.

SUMMARY

A system and method for dynamically recording vehicle data are provided. The system comprises an electronic unit onboard a vehicle, a data recording function hosted in the electronic unit, and one or more electronic data producers in operative communication with the data recording function. The data recording function is operative to receive a request specifying data parameters that at least include an identified electronic data set to record, a duration for the data recording, and a destination for the data recording. The data recording function is also operative to process the request based on the data parameters to produce a set of real time recorded data from the one or more electronic data producers, and to send the set of recorded data to a data storage location based on the destination in the request.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
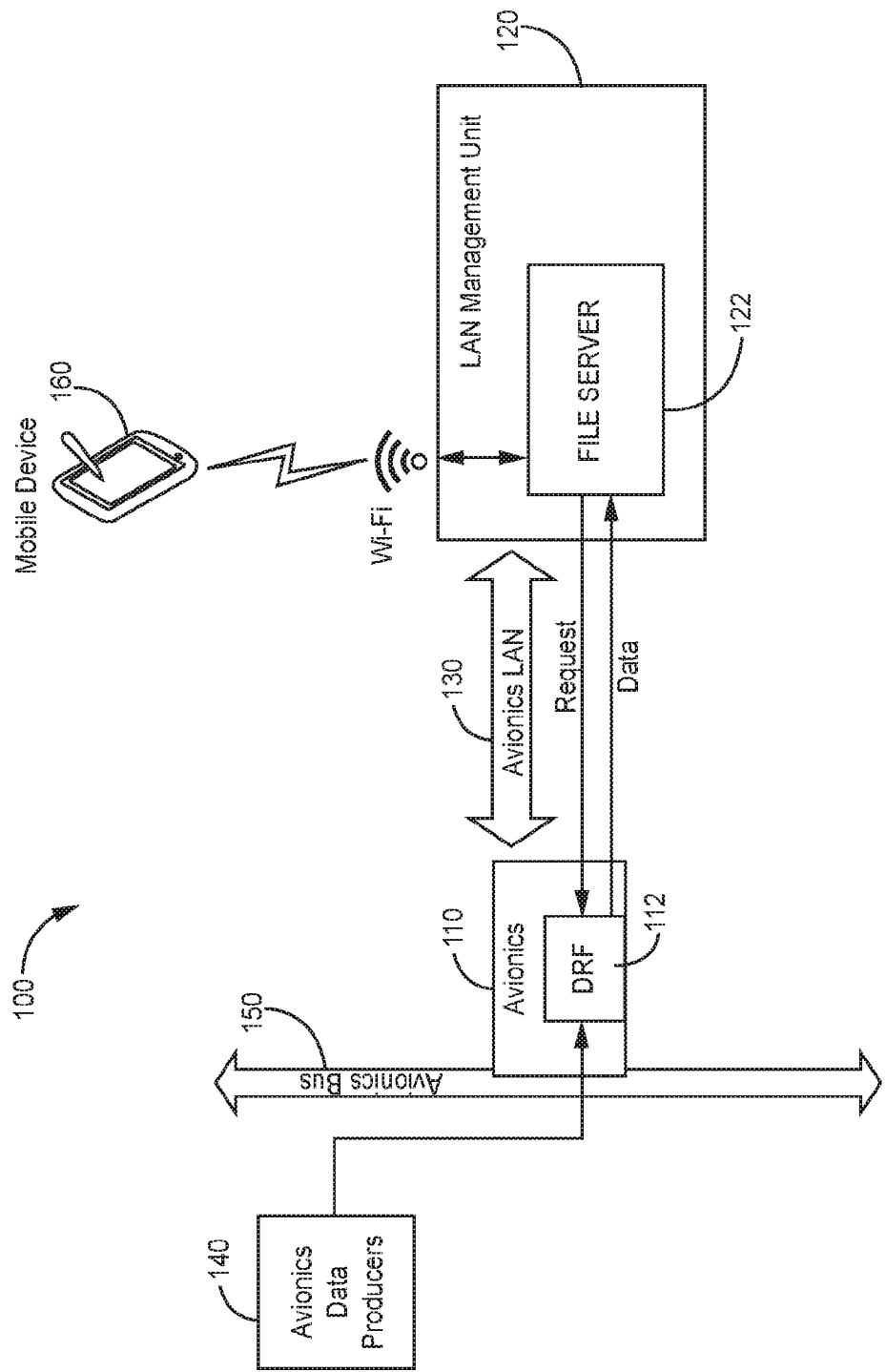
FIG. 1 a block diagram of a system for dynamically recording vehicle data, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for dynamically recording vehicle data with a data recording function are provided. The data recording function expands vehicle data recording potential to the super-set of vehicle data available on a vehicle data bus. The data recording function is implemented using a software protocol to configure data selection and file storage locations, both internal and external, in real time. The present approach allows pilots or third parties to use certified or non-certified devices to configure recorded content on-demand, and to provide a functional control to start, stop, and select storage locations for recorded data. In addition, the present approach provides for the ability to dynamically change vehicle data recording parameters in real time, and the ability to save the recorded data to any addressable location.

The data recording function has the technical benefit of alleviating manual effort for operators such as pilots, in terms of the flight logging process, and also provides a method of achieving on-demand data storage and portability for future use cases. The data recording function also allows for growth of future functionality by allowing access to all data on a given vehicle data bus.

The present approach provides for real-time recording of vehicle data upon an operator triggering a start and stop recording command. The data recording function can be implemented in various systems that allow an operator to start and stop a data recording based upon one or more user defined parameters. This functionality can be provided via a portable computing device such as a tablet (e.g., iPad), smart phone, electronic flight bag (EFB), or other input device (either external or as part of avionics, for example). In other embodiments, the data recording function can be implemented into various aircraft systems, such as a flight management system (FMS), and can be accessible to a pilot via flight pages on a cockpit screen.

In a method of operation for the data recording function, an application (which may be running on a tablet, EFB, avionics system, ground system, the cloud, etc.), sends a request to the data recording function specifying what data to record, for what duration, and to which file location (among other parameters). The data recording function, resident in a vehicle system, processes the request and consumes the vehicle data per the details of the request (start time, stop time, parameters to record, etc.) from a vehicle data bus. The data recording function then sends the recorded data to a file storage location as indicated in the request.

The file storage locations can be any internet protocol (IP) addressable location accessible to the data recording function, such as onboard storage, handheld storage, ground based storage, cloud storage, and the like. In addition, multiple application requests can be sent and processed by the data recording function at any given time.

Further details of the present system and method are described hereafter with reference to the drawings.

FIG. 1 illustrates a system 100 for dynamically recording vehicle data such as avionics data, according to one embodiment. The system 100 generally includes an electronic unit such as an avionics unit 110, and a local area network (LAN) management unit 120 in operative communication with avionics unit 110, such as through an avionics LAN 130. One or more electronic data producers such as avionics data producers 140 are in operative communication with avionics unit 110, such as through an avionics bus 150.

A data recording function (DRF) 112 resides in avionics unit 110, and is described further hereafter. A file server 122 resides in LAN management unit 120, and provides one or more data storage locations. The avionics data producers 140 are operative to send avionics data to DRF 112 such as through avionics bus 150. The DRF 112 is in operative communication with file server 122, such as through avionics LAN 130. A mobile device 160 is configured for wireless communication with file server 122, such as through a Wi-Fi connection on an aircraft.

During operation of system 100, a DRF application on mobile device 160 sends a request to DRF 112 through LAN management unit 120. The request specifies what data to record, for what duration, and to which file location (among other parameters). The DRF 112 processes the request and consumes the data per the details of the request (e.g., start time, stop time, parameters to record, etc.) from bus 150. The DRF 112 sends the requested data to a data storage location supported by file server 122 as indicated in the request, such as by file transfer protocol (FTP) or other conventional methods. The data storage locations can be any IP addressable location accessible to DRF 112, such as onboard storage, handheld storage, ground storage, cloud storage, or the like. In addition, multiple application requests can be sent to DRF 112 for processing at any given time.

Figure 2:
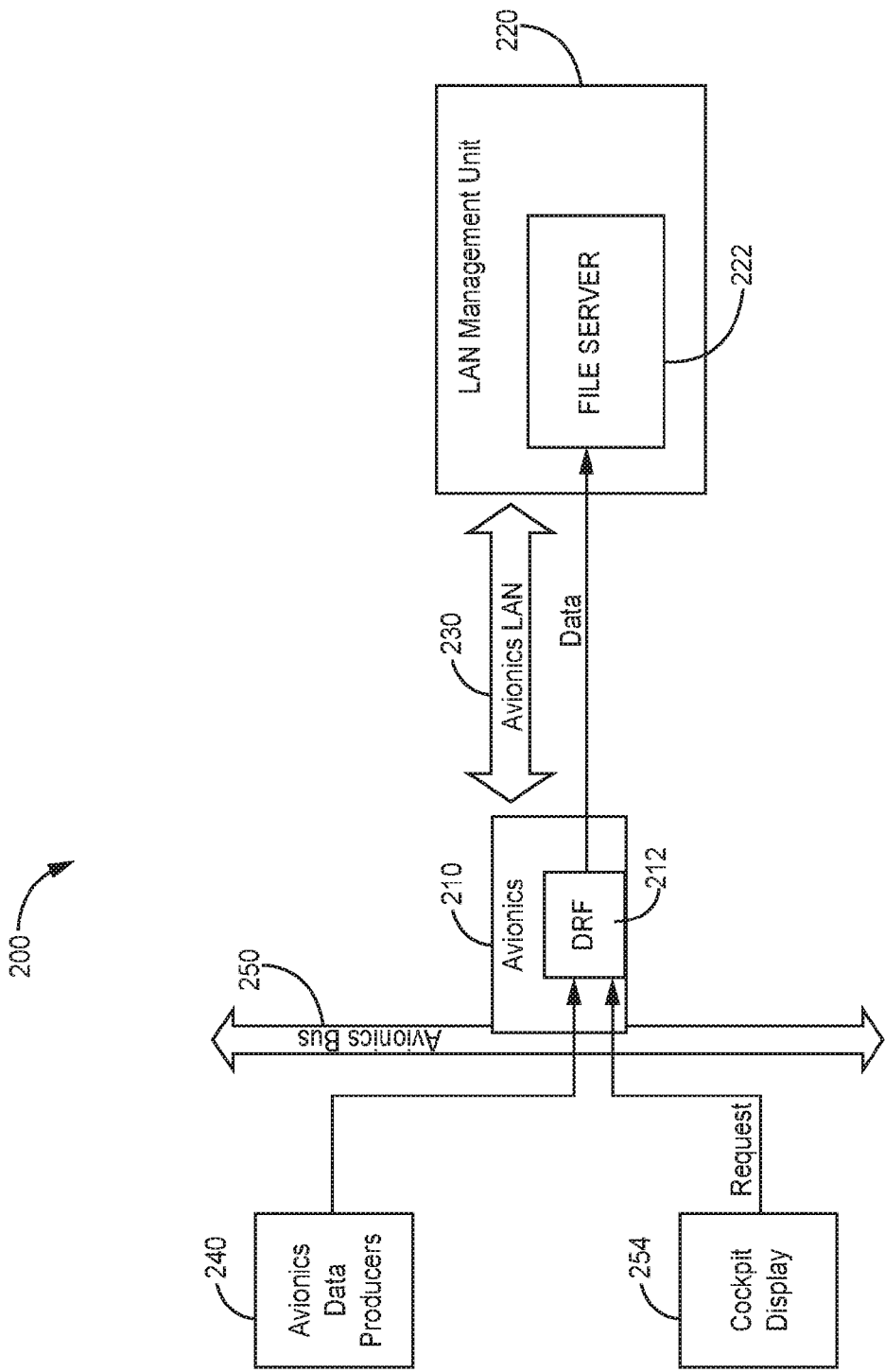
FIG. 2 a block diagram of a system for dynamically recording vehicle data, according to another embodiment.

FIG. 2 illustrates a system 200 for implementing a data recording function, according to another embodiment, such as onboard an aircraft. The system 200 generally includes an avionics unit 210, and a LAN management unit 220 in operative communication with avionics unit 210, such as through an avionics LAN 230. One or more avionics data producers 240 are in operative communication with avionics unit 210, such as through an avionics bus 250.

A DRF 212 resides in avionics unit 210, and a file server 222 resides in LAN management unit 220. The avionics data producers 240 are operative to send avionics data to DRF 212 such as through avionics bus 250. The DRF 212 is in operative communication with file server 222, such as through avionics LAN 230. As shown in FIG. 2, a cockpit display unit 254 is in operative communication with DRF 212, such as through avionics bus 250.

During operation of system 200, a DRF application in cockpit display unit 254 sends a request to DRF 212. The request specifies, for example, what data to record, for what duration, and to which file location. The DRF 212 processes the request and consumes the avionics data per the details of the request from avionics bus 250. The DRF 212 sends the requested data to a data storage location supported by file server 222, such as by FTP or other conventional methods.

Figure 3:
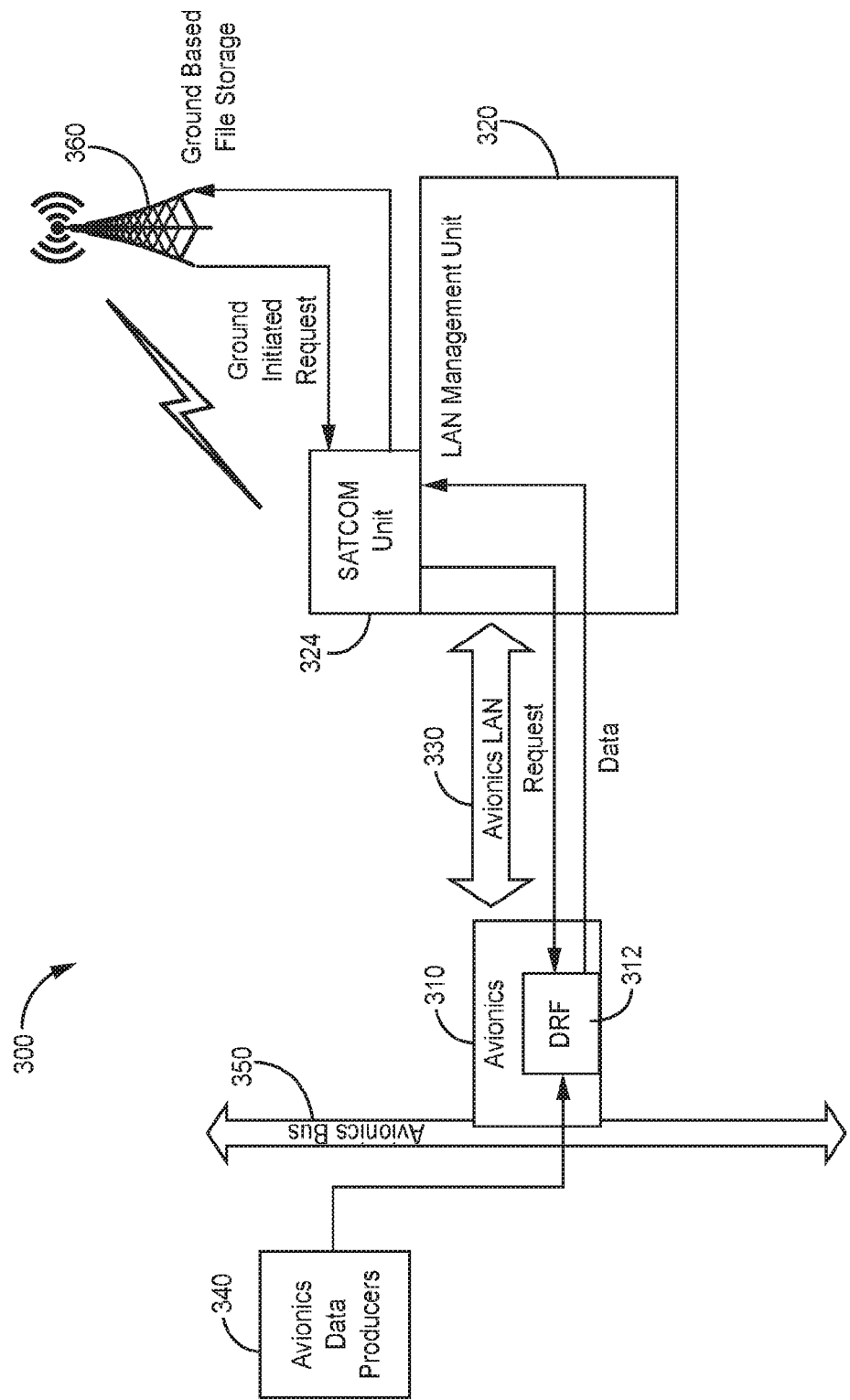
FIG. 3 a block diagram of a system for dynamically recording vehicle data according to a further embodiment.

FIG. 3 illustrates a system 300 for implementing a data recording function according to a further embodiment, such as onboard an aircraft. The system 300 generally includes an avionics unit 310, and a LAN management unit 320 in operative communication with avionics unit 310, such as through an avionics LAN 330. One or more avionics data producers 340 are in operative communication with avionics unit 310, such as through an avionics bus 350.

A DRF 312 resides in avionics unit 310. A satellite communications (SATCOM) unit 324 onboard the aircraft is coupled to LAN management unit 320. The avionics data producers 340 are operative to send avionics data to DRF 312 such as through avionics bus 350. The DRF 312 is in operative communication with SATCOM unit 324 such as through avionics LAN 330. In addition, a ground station 360, such as an airline operation center, is in operative communication with SATCOM unit 324.

During operation of system 300, a DRF application at ground station 360 sends a ground initiated request to DRF 312 through SATCOM unit 324. The request specifies, for example, what data to record, for what duration, and to which file location. The DRF 312 processes the request and consumes the avionics data per the details of the request from avionics bus 350. The DRF 312 then sends the requested data through SATCOM unit 324 to a ground based file storage location.

Figure 4:
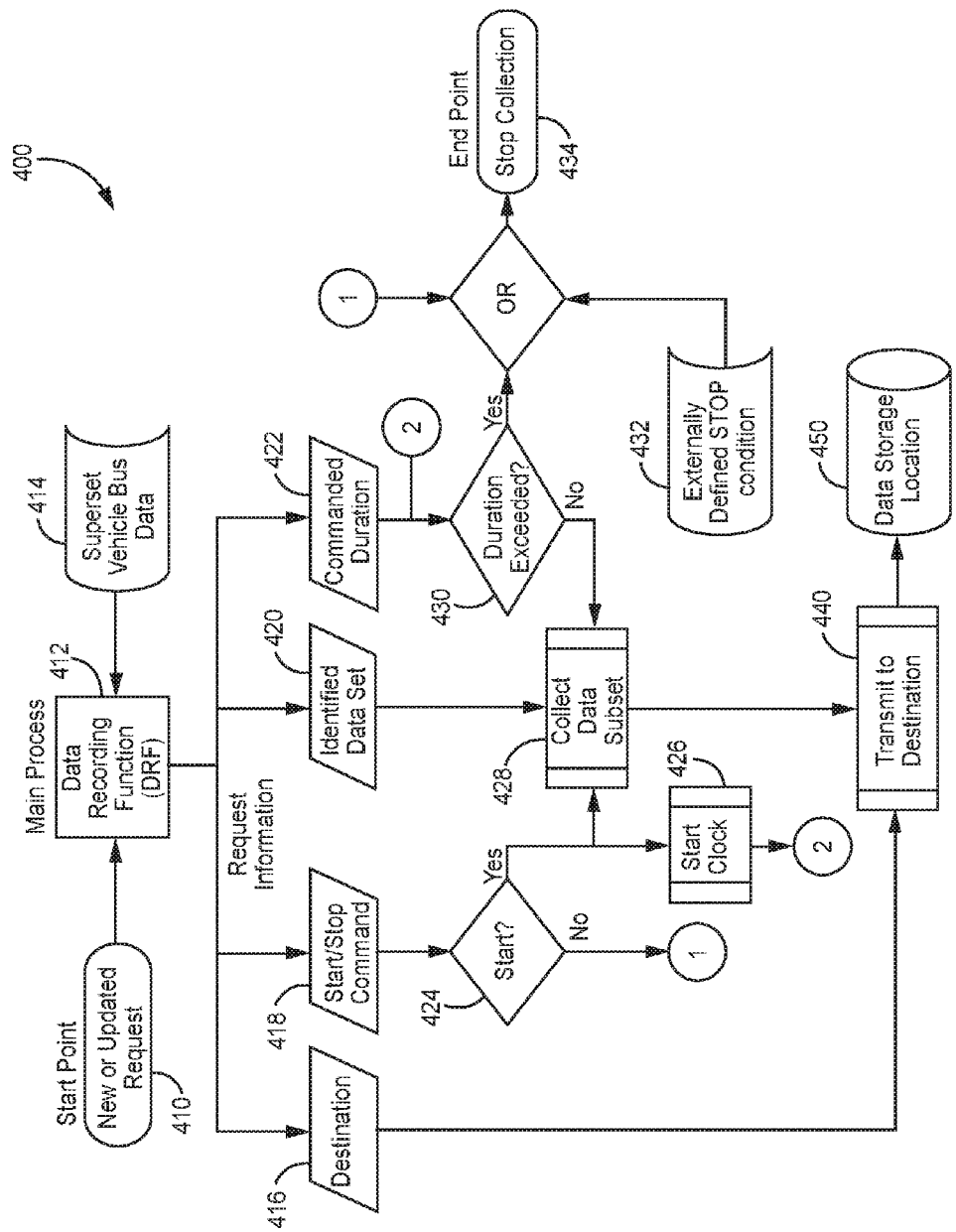
FIG. 4 is a flow diagram of an exemplary operational method for a data recording function for dynamically recording vehicle data.

FIG. 4 is a software flow diagram illustrating an exemplary operational method 400 for the data recording function, according to one embodiment. At a start point, a new or updated request is generated (block 410) and is sent to the data recording function (DRF) (block 412). A superset of vehicle bus data (block 414) is available to be sent to the DRF during a main process. The DRF processes the request information, which can be destination information for the data (block 416), a start/stop command (block 418), an identified data set such as an electronic data set (block 420), and a commanded duration (block 422). The destination information (from block 416) is sent to a transmit to destination module (block 440), which operatively communicates with a data storage location (block 450).

From the start/stop command (block 418), a determination is made whether a start command is given (block 424). If yes, a start clock module is initiated (block 426). A collect data subset module (block 428) collects the data after the start command based on the identified data set (from block 420), and sends the collected data subset to the transmit to destination module (block 440), which in turn sends the collected data subset to the data storage location (block 450).

After the start clock module is initiated (at block 426), a determination is made whether the commanded duration is exceeded (block 430). If not, the collect data subset module (block 428) continues to operate. If the duration is exceeded, or an externally defined stop condition occurs (block 432), a stop collection end point is reached (block 434). In addition, if a start command was not given (at block 424), the stop collection end point (block 434) is also reached.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a system for dynamically recording vehicle data, the system comprising: an electronic unit onboard a vehicle; a data recording function hosted in the electronic unit; and one or more electronic data producers in operative communication with the data recording function; wherein the data recording function is operative to: receive a request specifying data parameters that at least include an identified electronic data set to record, a duration for the data recording, and a destination for the data recording; process the request based on the data parameters to produce a set of real time recorded data from the one or more electronic data producers; and send the set of recorded data to a data storage location based on the destination in the request.

Example 2 includes the system of Example 1, further comprising a local area network (LAN) management unit in operative communication with the electronic unit through an electronic LAN.

Example 3 includes the system of Example 2, further comprising a file server hosted on the LAN management unit and configured to provide one or more data storage locations.

Example 4 includes the system of Example 3, wherein the data recording function is in operative communication with the file server.

Example 5 includes the system of Example 4, wherein the data recording function is configured to receive the request from an application on a mobile device that is configured for wireless communication with the LAN management unit.

Example 6 includes the system of any of Examples 4-5, wherein the data storage location is provided by the file server.

Example 7 includes the system of Example 4, wherein the data recording function is configured to receive the request from an application residing in a cockpit display unit that operatively communicates with the electronic unit.

Example 8 includes the system of Example 7, wherein the data storage location is provided by the file server.

Example 9 includes the system of Example 4, wherein the data recording function is configured to receive the request from an application at a ground station that is in operative communication with the LAN management unit.

Example 10 includes the system of Example 9, wherein the data recording function is configured to send the set of recorded data to a ground data storage location.

Example 11 includes the system of any of Examples 1-10, wherein the one or more electronic data producers are in operative communication with the data recording function through an electronic bus.

Example 12 includes a method for dynamically recording vehicle data, the method comprising: receiving electronic data at a data recording function in an electronic unit of a vehicle; receiving a request specifying data parameters at the data recording function, wherein the data parameters include an identified electronic data set, a commanded duration for recording the data set, a destination for the recorded data set, and a start/stop command for recording; processing the request based on the data parameters to produce a real time recorded data set; and sending the real time recorded data set to a data storage location based on the destination in the request.

Example 13 includes the method of Example 12, wherein the request is received from an application residing in a mobile device that is configured for wireless communication with the data recording function.

Example 14 includes the method of Example 13, wherein the mobile device comprises a portable computing device, a tablet, a smart phone, or an electronic flight bag.

Example 15 includes the method of Example 12, wherein the request is received from an application residing in a cockpit display unit of the vehicle that operatively communicates with the electronic unit.

Example 16 includes the method of Example 12, wherein the request is received from an application residing at a ground station that is in operative communication with the electronic unit through a satellite communications unit.

Example 17 includes the method of any of Examples 12-16, wherein the data storage location comprises onboard storage, handheld storage, ground storage, or cloud storage.

Example 18 includes a computer program product, comprising: a non-transitory computer readable medium including instructions executable by a processor to perform a method for dynamically recording avionics data, the method comprising: receiving avionics bus data at a data recording function in an avionics unit of an aircraft; receiving a request specifying data parameters at the data recording function, wherein the data parameters include an identified avionics data set, a commanded duration for recording the avionics data set, a destination for the recorded avionics data set, and a start/stop command for recording; processing the request based on the data parameters to produce a real time recorded avionics data set; and sending the real time recorded avionics data set to a data storage location based on the destination in the request.

Example 19 includes the computer program product of Example 18, wherein during processing of the request, the method further comprising: sending the destination to a transmit to destination module, which operatively communicates with the data storage location; initiating a start clock module when a start command is given; sending the identified avionics data set to a collect data subset module; and sending the collected avionics data to the transmit to destination module for transmission to the data storage location.

Example 20 includes the computer program product of Example 19, wherein during processing of the request, the method further comprising: after the start clock module is initiated, determining whether the commanded duration is exceeded; if the commanded duration is not exceeded, continue sending the identified avionics data set to the collect data subset module; if the commanded duration is exceeded, or an externally defined stop condition occurs, stopping collection of the avionics data set.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for dynamically recording vehicle data, the system comprising:
an electronic unit onboard a vehicle;
a data recording function hosted in the electronic unit;
one or more electronic data producers in operative communication with the data recording function; and
a local area network (LAN) management unit onboard the vehicle in operative communication with the electronic unit through an electronic LAN, the LAN management unit hosting a file server that includes one or more data storage locations;
wherein the data recording function is configured to:
receive a request specifying data parameters, the specified data parameters including at least an identified electronic data set to record for a data recording, a duration for the data recording, and a destination for the data recording;
process the received request based on the specified data parameters to produce a set of real time recorded data from the one or more electronic data producers; and
send the set of real time recorded data to a data storage location of the one or more data storage locations of the file server based on the destination for the data recording in the request.

2. The system of claim 1, wherein the data recording function is in operative communication with the file server.

3. The system of claim 2, wherein the data recording function is configured to receive the request from an application on a mobile device that is configured for wireless communication with the LAN management unit.

4. The system of claim 3, wherein the data storage location is provided by the file server.

5. The system of claim 2, wherein the data recording function is configured to receive the request from an application residing in a cockpit display unit that operatively communicates with the electronic unit.

6. The system of claim 5, wherein the data storage location is provided by the file server.

7. The system of claim 1, wherein the data recording function is configured to receive the request from an application at a ground station that is in operative communication with the LAN management unit.

8. The system of claim 7, wherein the data recording function is configured to send the set of recorded data to a ground data storage location.

9. The system of claim 1, wherein the one or more electronic data producers are in operative communication with the data recording function through an electronic bus.

10. A method for dynamically recording vehicle data, the method comprising:
receiving, by a data recording function in an electronic unit of a vehicle, electronic data from one or more electronic data producers
receiving, by the data recording function, a request specifying data parameters, wherein the specified data parameters include an identified electronic data set to record, a commanded duration for recording the identified electronic data set, a destination for the recorded electronic data set, and a start/stop command for recording;
processing, by the data recording function, the received request based on the specified data parameters to produce a real time recorded data set; and
sending, by the data recording function, the real time recorded data set to a data storage location of one or more data storage locations of a file server hosted on a local area network (LAN) management unit onboard the vehicle based on the destination in the request.

11. The method of claim 10, wherein the request is received from an application residing in a mobile device that is configured for wireless communication with the data recording function.

12. The method of claim 11, wherein the mobile device comprises a portable computing device, a tablet, a smart phone, or an electronic flight bag.

13. The method of claim 10, wherein the request is received from an application residing in a cockpit display unit of the vehicle that operatively communicates with the electronic unit.

14. The method of claim 10, wherein the request is received from an application residing at a ground station that is in operative communication with the electronic unit through a satellite communications unit.

15. A computer program product, comprising:
a non-transitory computer readable medium including instructions executable by a processor to perform a method for dynamically recording avionics data, the method comprising:
receiving, by a data recording function in an avionics unit of an aircraft, avionics bus data;
receiving, by the data recording function, a request specifying data parameters, wherein the specified data parameters include an identified avionics data set to record, a commanded duration for recording the identified avionics data set, a destination for the recorded avionics data set, and a start/stop command for recording;
processing, by the data recording function, the received request based on the specified data parameters to produce a real time recorded avionics data set; and
sending, by the data recording function, the real time recorded avionics data set to a data storage location of one or more data storage locations of a file server hosted on a local area network (LAN) management unit onboard the vehicle based on the destination in the request.

16. The computer program product of claim 15, wherein during processing of the request, the method further comprising:
sending, by the data recording function, the destination to a transmit to destination module, which operatively communicates with the data storage location;
initiating, by the data recording function, a start clock module when a start command is given;
sending, by the data recording function, the identified avionics data set to a collect data subset module; and
sending, by the data recording function, the collected avionics data to the transmit to destination module for transmission to the data storage location.

17. The computer program product of claim 16, wherein during processing of the request, the method further comprising:
after the start clock module is initiated, determining, by the data recording function, whether the commanded duration is exceeded;
if the commanded duration is not exceeded, continue sending, by the data recording function, the identified avionics data set to the collect data subset module;

if the commanded duration is exceeded, or an externally defined stop condition occurs, stopping, by the data recording function, collection of the avionics data set.

\* \* \* \* \*